United States Patent
Konchitsky et al.

(10) Patent No.: US 9,563,694 B2
(45) Date of Patent: Feb. 7, 2017

(54) PATENT SEARCH ENGINE WITH STATISTICAL SNAPSHOTS

(76) Inventors: Alon Konchitsky, Cupertino, CA (US); Amit J Ronen, Mountain View, CA (US); Yaniv Konchitchki, Los Angeles, CA (US)

(*) Notice: Subject to any disclaimer, the term of this patent is extended or adjusted under 35 U.S.C. 154(b) by 825 days.

(21) Appl. No.: 13/046,756

(22) Filed: Mar. 13, 2011

(65) Prior Publication Data
US 2011/0225135 A1   Sep. 15, 2011

Related U.S. Application Data

(60) Provisional application No. 61/313,869, filed on Mar. 15, 2010.

(51) Int. Cl.
*G06F 7/00* (2006.01)
*G06F 17/00* (2006.01)
*G06F 17/30* (2006.01)

(52) U.S. Cl.
CPC ............................ *G06F 17/30696* (2013.01)

(58) Field of Classification Search
CPC ............ G06F 17/30979; G06F 17/30982; G06F 17/30241; G06F 17/3087; G06F 17/30864; G06F 17/30657; G06F 17/30011; G06F 2216/11; G06F 17/30539; G06F 17/3053; G06F 17/30554; G06F 17/30687; G06F 17/30643; G06F 17/30598; G06F 17/3071

See application file for complete search history.

(56) References Cited

U.S. PATENT DOCUMENTS

| | | | |
|---|---|---|---|
| 6,326,962 B1 * | 12/2001 | Szabo ........................... | 715/762 |
| 6,401,118 B1 * | 6/2002 | Thomas ........................ | 709/224 |
| 9,418,083 B2 * | 8/2016 | Pedersen ........... | G06F 17/30289 |
| 2002/0184130 A1 * | 12/2002 | Blasko ............................ | 705/35 |
| 2003/0126136 A1 * | 7/2003 | Omoigui ........................ | 707/10 |
| 2005/0132296 A1 * | 6/2005 | Milic-Frayling et al. .... | 715/745 |
| 2006/0106847 A1 * | 5/2006 | Eckardt, III ...... | G06F 17/30696 |
| 2006/0271379 A1 * | 11/2006 | Resnick et al. ................... | 705/1 |
| 2007/0038602 A1 * | 2/2007 | Weyand ............ | G06F 17/30864 |
| 2007/0038620 A1 * | 2/2007 | Ka et al. ........................... | 707/5 |
| 2007/0073748 A1 * | 3/2007 | Barney ............. | G06F 17/30675 |
| 2009/0112532 A1 * | 4/2009 | Foslien et al. .................... | 703/2 |
| 2009/0182609 A1 * | 7/2009 | Kelleher .......................... | 705/9 |
| 2010/0010968 A1 * | 1/2010 | Redlich et al. ................... | 707/3 |
| 2011/0072024 A1 * | 3/2011 | Barney ............. | G06F 17/30675 707/749 |

* cited by examiner

*Primary Examiner* — Susan Chen
(74) *Attorney, Agent, or Firm* — Steven A. Nielsen; www.NielsenPatents.com

(57) ABSTRACT

A search engine finds patents, patent applications and related documents and presents a selection of found documents in textual formats and/or graphical formats. After executing a search, the displayed information may include a selection of results sorted by inventor name, year and other variables found within patent documents. Financial data pertaining to patent owning entities is presented along with patent portfolio analysis and estimates of financial worth.

13 Claims, 21 Drawing Sheets

FIG. 4

PRIOR ART

USPTO PATENT FULL-TEXT AND IMAGE DATABASE

[Home] [Quick] [Advanced] [Pat Num] [Help]
[View Cart]

Data current through July 15, 2008.

Query [Help]

Term 1: [          ] in Field 1: [All Fields ▼]
                                 [AND ▼]
Term 2: [          ] in Field 2: [All Fields ▼]

Select years [Help]
[1976 to present [full-text] ▼]        [Search] [Reset]

Patents from 1790 through 1975 are searchable only by Issue Date, Patent Number, and Current US Classification.

(Source: http://www.uspto.gov)

(Source: http://www.google.com/patents)

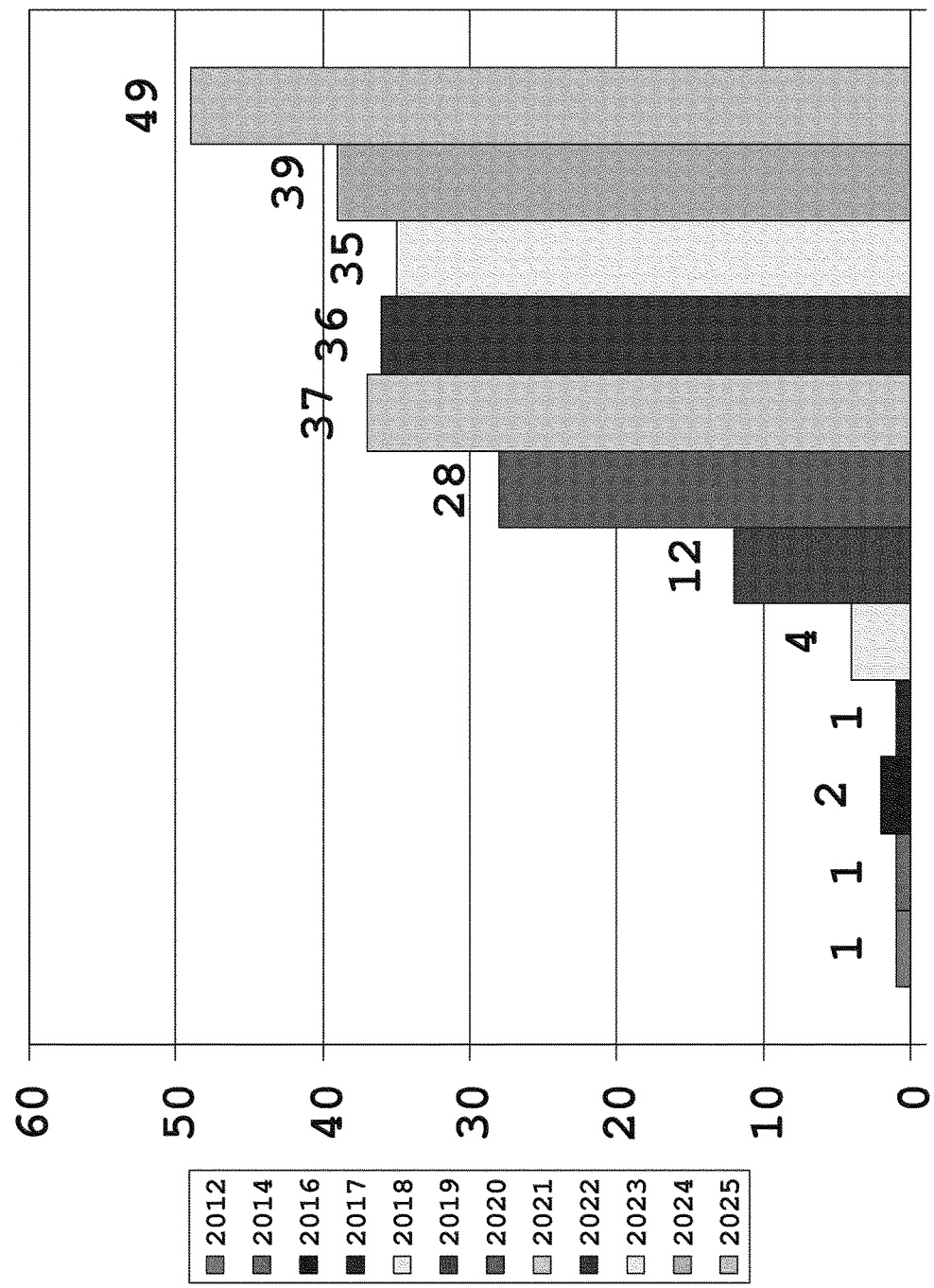

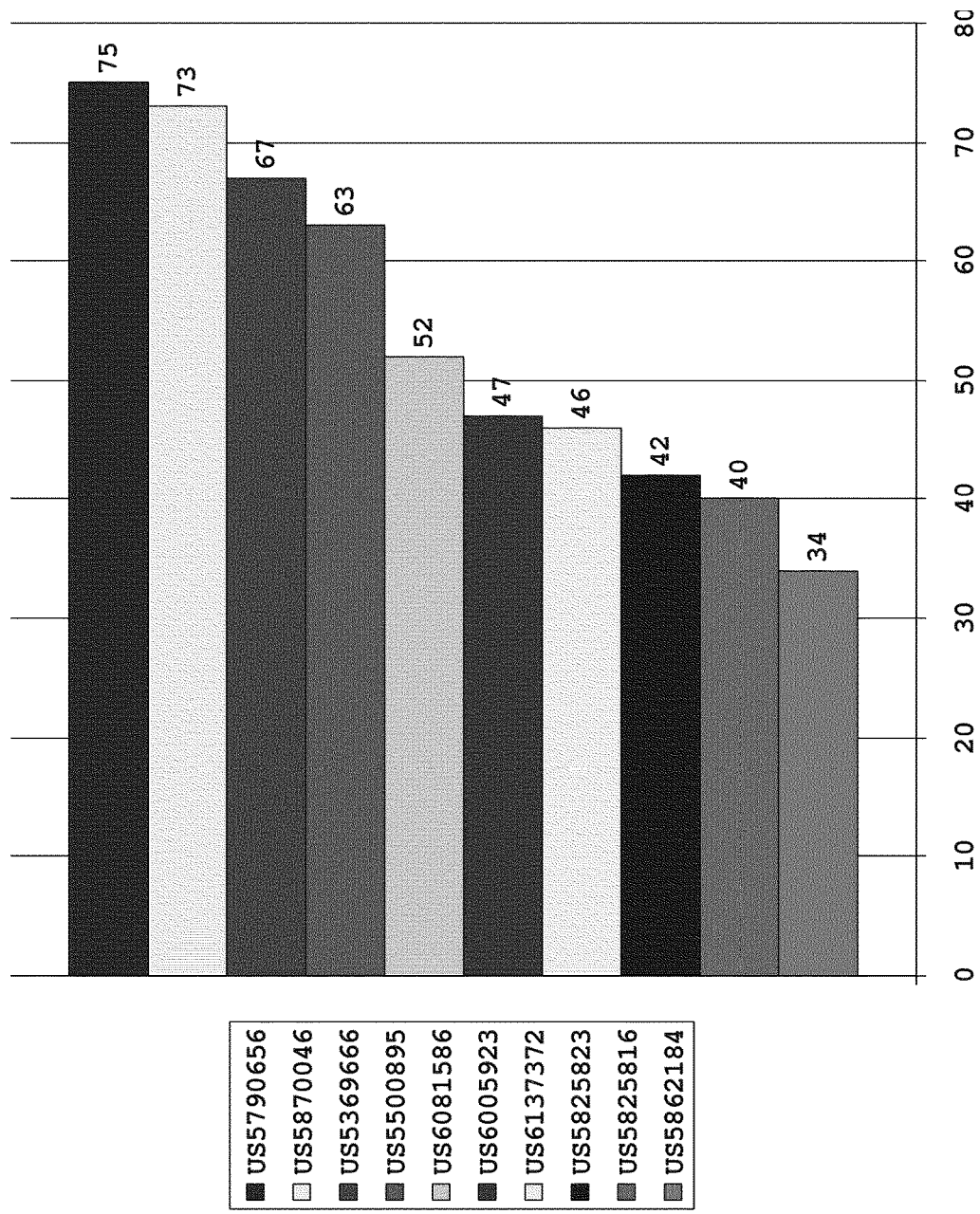

FIG. 11b
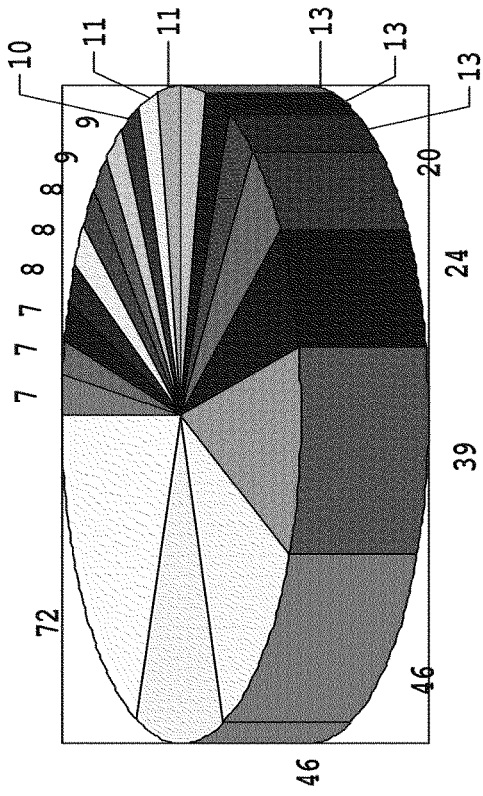
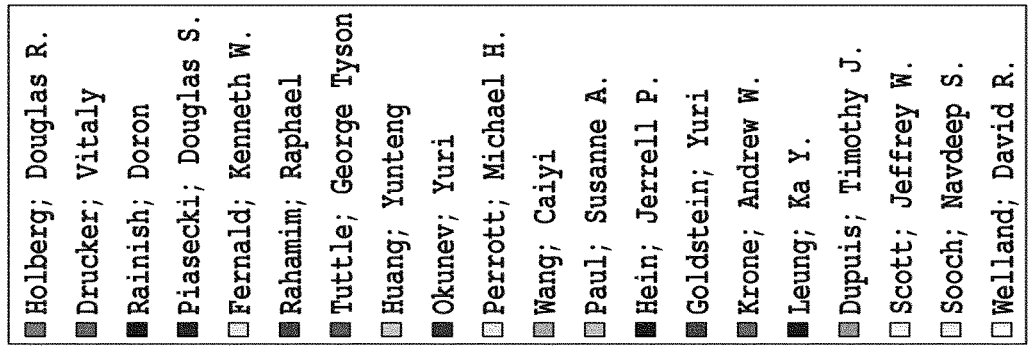

PATENT SEARCH ENGINE WITH STATISTICAL SNAPSHOTS

This application claims the benefit of application Ser. No. 61/313,869 filed on Mar. 15, 2010, the contents of which are herein incorporated by reference.

A search engine displaying statistical information about patent search queries is presented. The results retrieved by the search engine are quantified, analyzed and displayed as graphs, pie charts, 2D, 3D graphs and other formats to the user. An embodiment of the disclosed invention also displays search queries in ways including, but not limited to, top IPC code, most patents cited by publication number, patents issued per year, patents and expired per year.

REFERENCES CITED

| U.S. Pat. No. 6,326,962 B1 | Andrew J. Szabo | December 2001 |
| U.S. Pat. No. 5,421,008 | Banning et al | May 1995 |
| U.S. Pat. No. 6,271,840 B1 | Finseth et al | August 2001 |

FIELD OF THE INVENTION

The invention relates to the search engine output and more particularly to patent search engine outputs that visually display the results of the search queries. An embodiment of the present invention displays results of patent search queries in a graphical way representing data in graphs, pie charts, sorted by the year, IPC code, and cited by publication number.

BACKGROUND OF THE INVENTION

Internet usage levels have risen dramatically over the last decade raising the demand for technical, vital, personal and even trivial information. With the rise of the Internet, almost all modern communication devices have access to number of databases. With such vast amounts of data available on the Internet, it is increasingly becoming difficult to decipher or recognize relevant information from results displayed in purely textual formats.

Patent searches have become subject of significant interest because of the increasing number of patents filed per year. Traditionally, patent search engines including USPTO and third party search engines return search queries in a text format only. The patents that match the search criteria the most are displayed at the top. For some search engines, the patents with most number of hits (views) are displayed at the top. Though the search engines retrieve relevant information most of the time, the results are text based. The user does not an option but to manually go through all the text results.

An embodiment of the disclosed graphical display of search queries eliminates any need for the user to go through all the text based results and improving the rate at which the hundreds of search pages can be analyzed in few graphs.

PRIOR ART

A search engine is a great mechanism for people looking to retrieve information about almost anything. Popular search engines in the market today display search results in text format. These search engines have a database consisting of a number of web pages. The user's search query is applied to this database to identify the address of the web pages that meet the search query.

Different search engines have different methods to build their databases. The results returned by these search engines may differ from one another. Patent search engine databases are relatively smaller compared to regular search engine databases. But the number of patents filed both in US and internationally has dramatically risen over the last decade, there is a need to display these results in a graphical way combined with the textual way.

SUMMARY OF THE INVENTION

The present invention overcomes many of the shortfalls of the current generation patent search engines by providing graphical information including, but not limited to, 2D, 3D graphs, pie charts, sorting the patents by inventor name, year, and IPC code.

It is the object of the present invention to provide patent search information which comprises a search query input window that allows the user to input a string of characters, patent numbers, inventors and other information. It is a further object to display results returned in text format on one section of the webpage and display results in a graphical way on the other section of the webpage.

In another object of the invention the graphical display includes, but not limited to 2D, 3D graphs, pie charts, sorting the patents by inventor name, year, IPC code etc. Yet another object of the invention is to store user configuration parameters such as font size, text color, backgrounds etc.

The patent web page may have changed after the graphical information was loaded. So in yet another object of the invention, the snapshot representation is reprocessed, reloaded and updated based on the number of hits/visits of different patents.

BRIEF DESCRIPTION OF THE DRAWINGS

The detailed description of the appended drawings is intended as a description of a preferred embodiment of the invention and is not intended to represent the only forms in which the present invention may be utilized. Those related in the art will appreciate that the same or equivalent functions may be accomplished by different embodiments that are also intended to be encompassed within the spirit and scope of the current invention.

FIG. 4 is a snapshot of the United States Patent and Trademark Office (USPTO) search engine (Source: http://www.uspto.gov) and is prior art.

FIG. 8b is a schematic histogram plot of the patents expired per year for a specific search query.

FIG. 9b is a schematic histogram plot of the 10 most cited US patents by publication number.

FIG. 11b is a schematic pie chart of the top 20 inventors.

DESCRIPTION OF THE PREFERRED EMBODIMENTS

Figure 1:
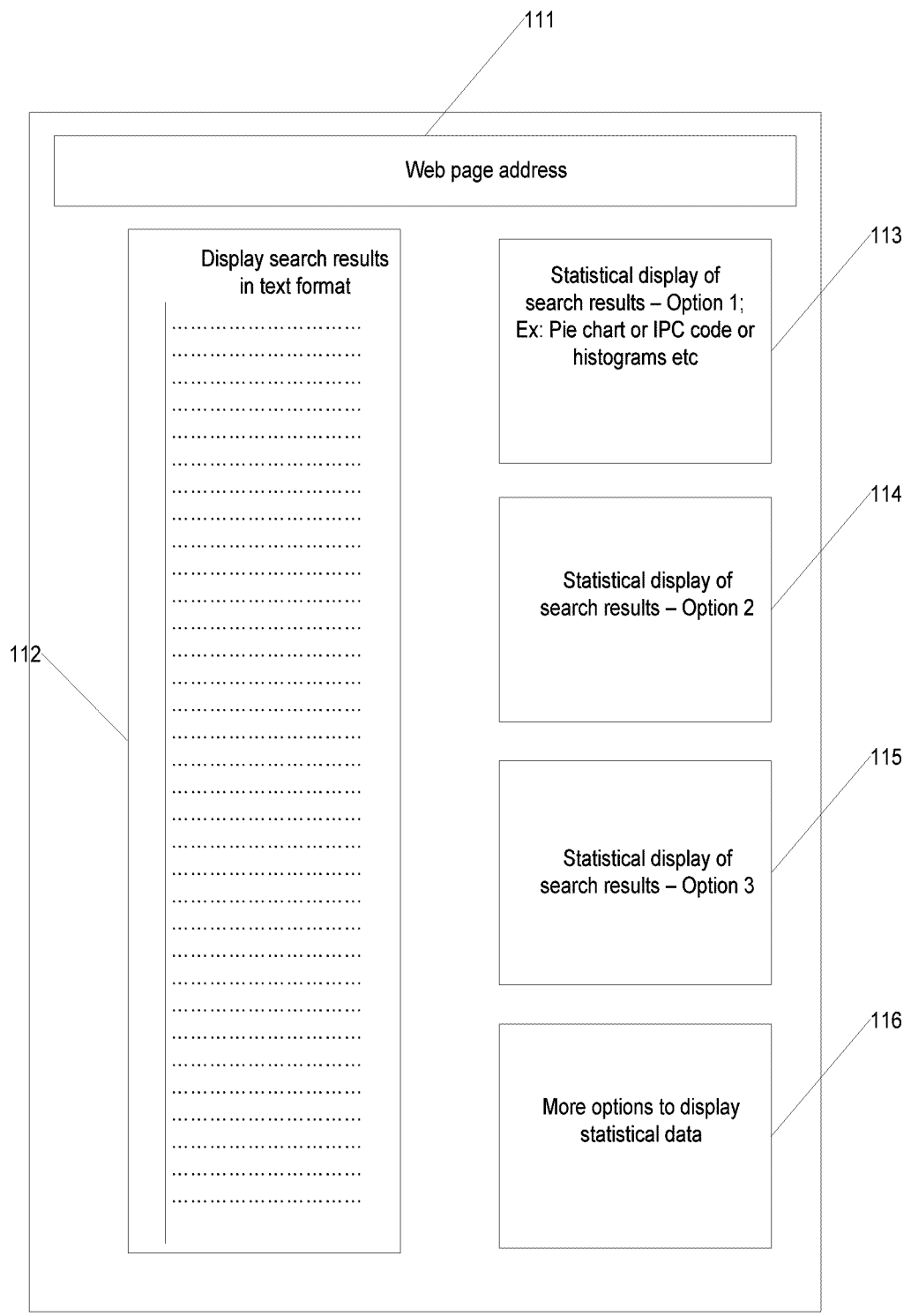
FIG. 1 is a schematic block diagram illustrating a first embodiment of the current invention.

In FIG. 1, the information associated with the URL is represented at 111. The text based results for a search query is displayed at 112. The statistical information, like pie charts, histograms etc, is displayed at 113. Other statistical information like 2D, 3D graphs, patents sorted by year, IPC code etc are displayed at 114, 115, 116.

Figure 2:
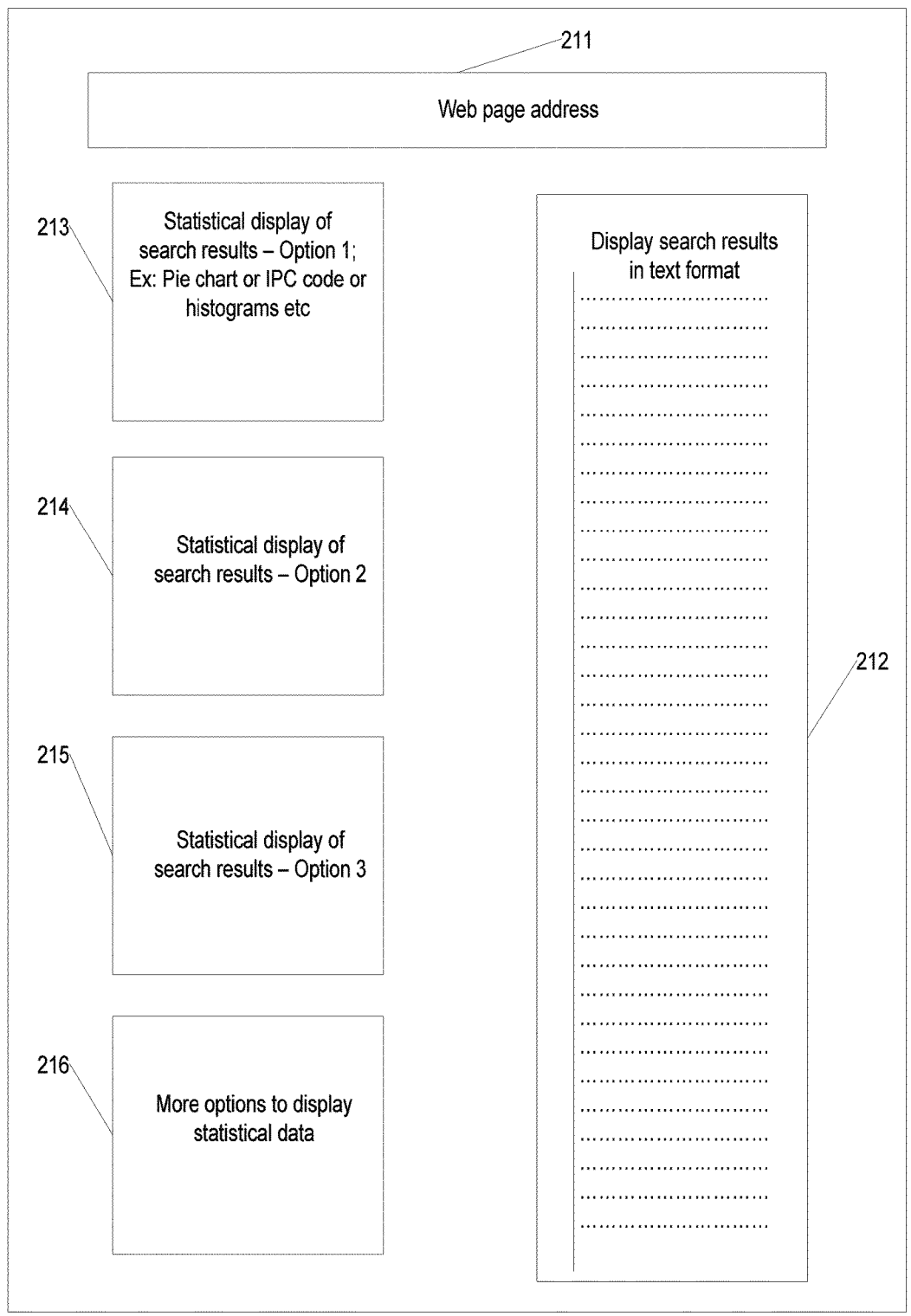
FIG. 2 is a schematic block diagram illustrating a second embodiment of the current invention.

In FIG. 2, the information associated with the URL is represented at 211. The statistical information, like pie charts, histograms etc, is displayed at 213. The text based results for a search query is displayed at 212. Other statistical information like 2D, 3D graphs, patents sorted by year, IPC code etc are displayed at 214, 215, 216.

Figure 3:
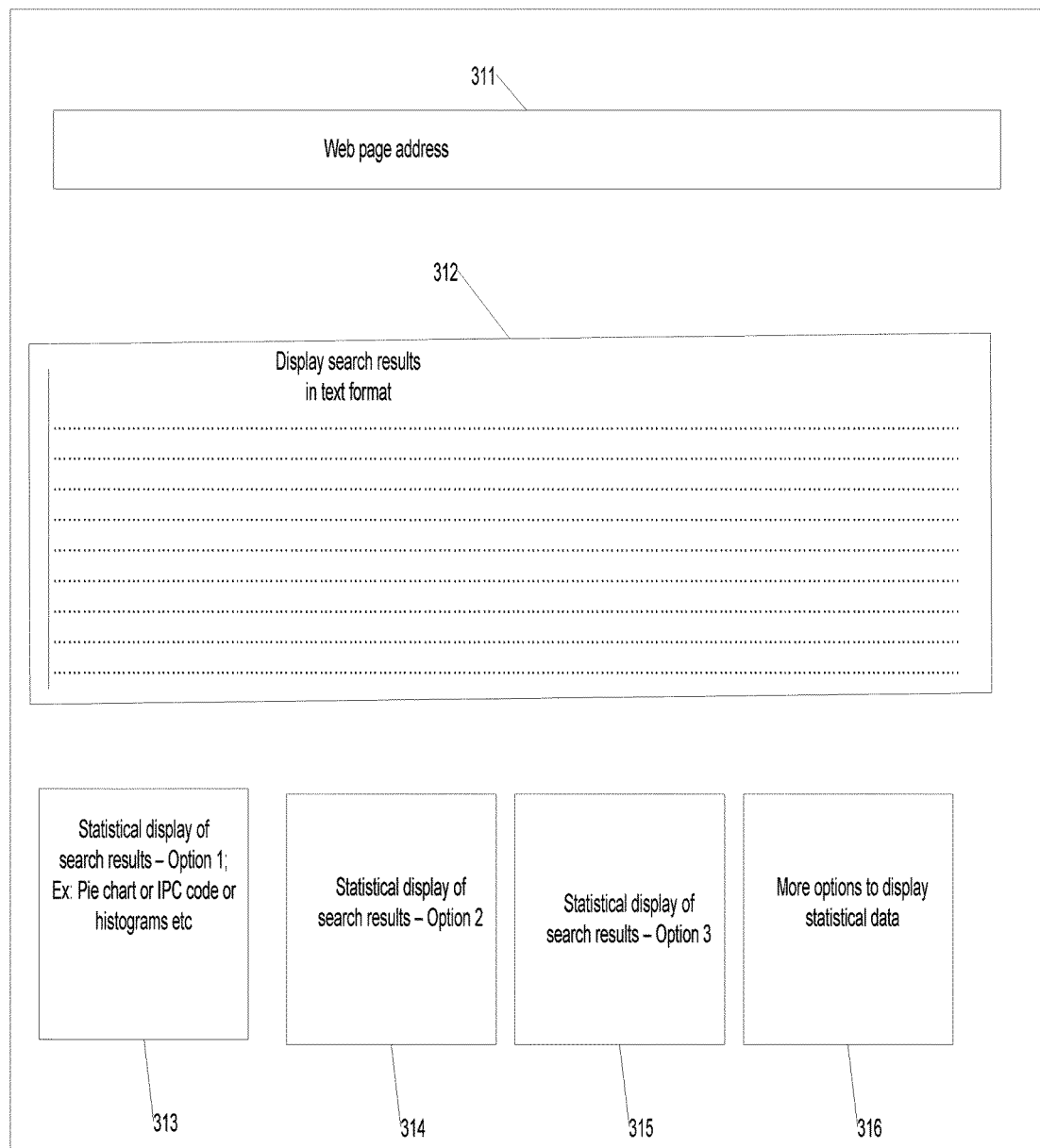
FIG. 3 is a schematic block diagram illustrating a third embodiment of the current invention.

In FIG. 3, the information associated with the URL is represented at 311. The statistical information, like 2D, 3D graphs, patents sorted by year, IPC code etc are displayed at 214, 215, 216. Pie charts, histograms etc, is displayed at 313. The text based results for a search query is displayed at 312.

In FIG. 4, a snapshot of the United States Patent and Trademark Office (USPTO) search engine is shown. Though they are many permutations and combinations to search patents, all are text based queries.

Figure 5:
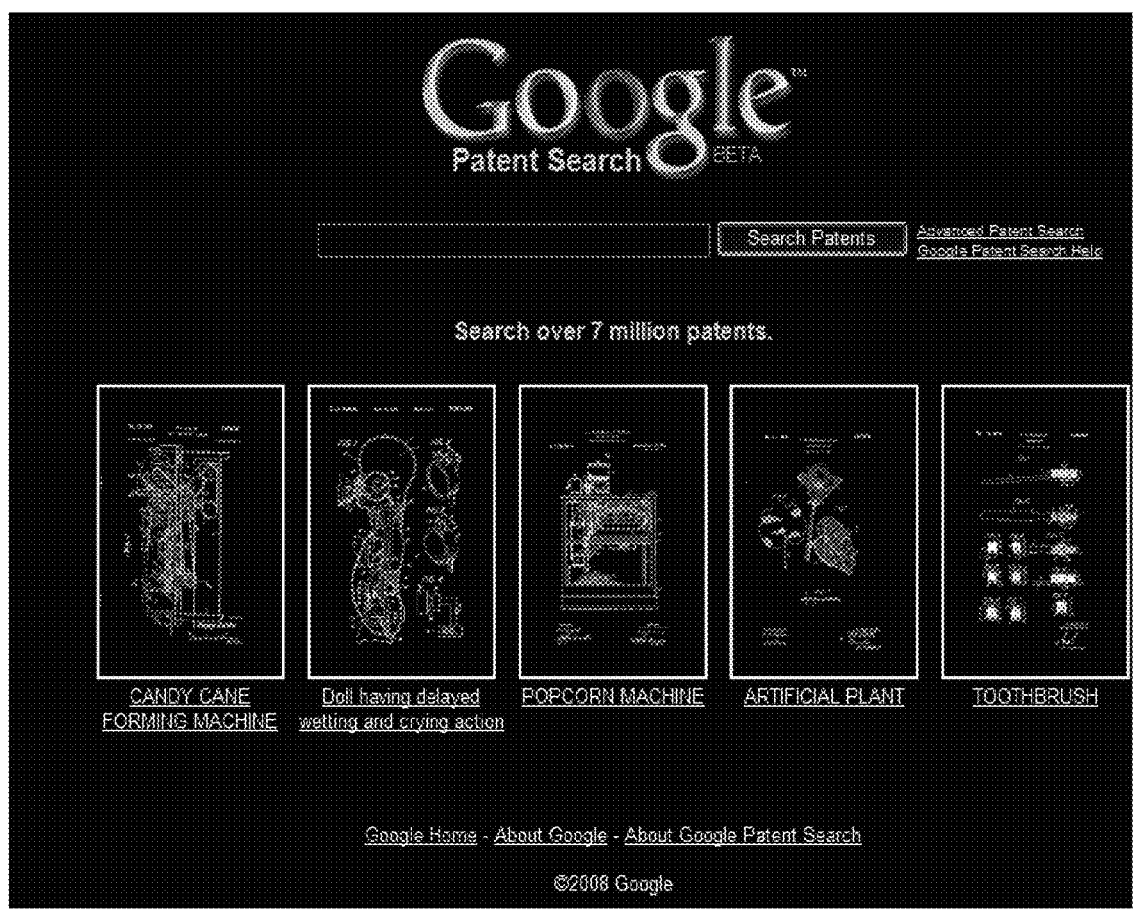
FIG. 5 is a snapshot of the Google patent search with text based search engine and is prior art.

In FIG. 5, a snapshot of the Google patent search with text based search engine is shown. As seen the search queries are text based.

Figure 6A:
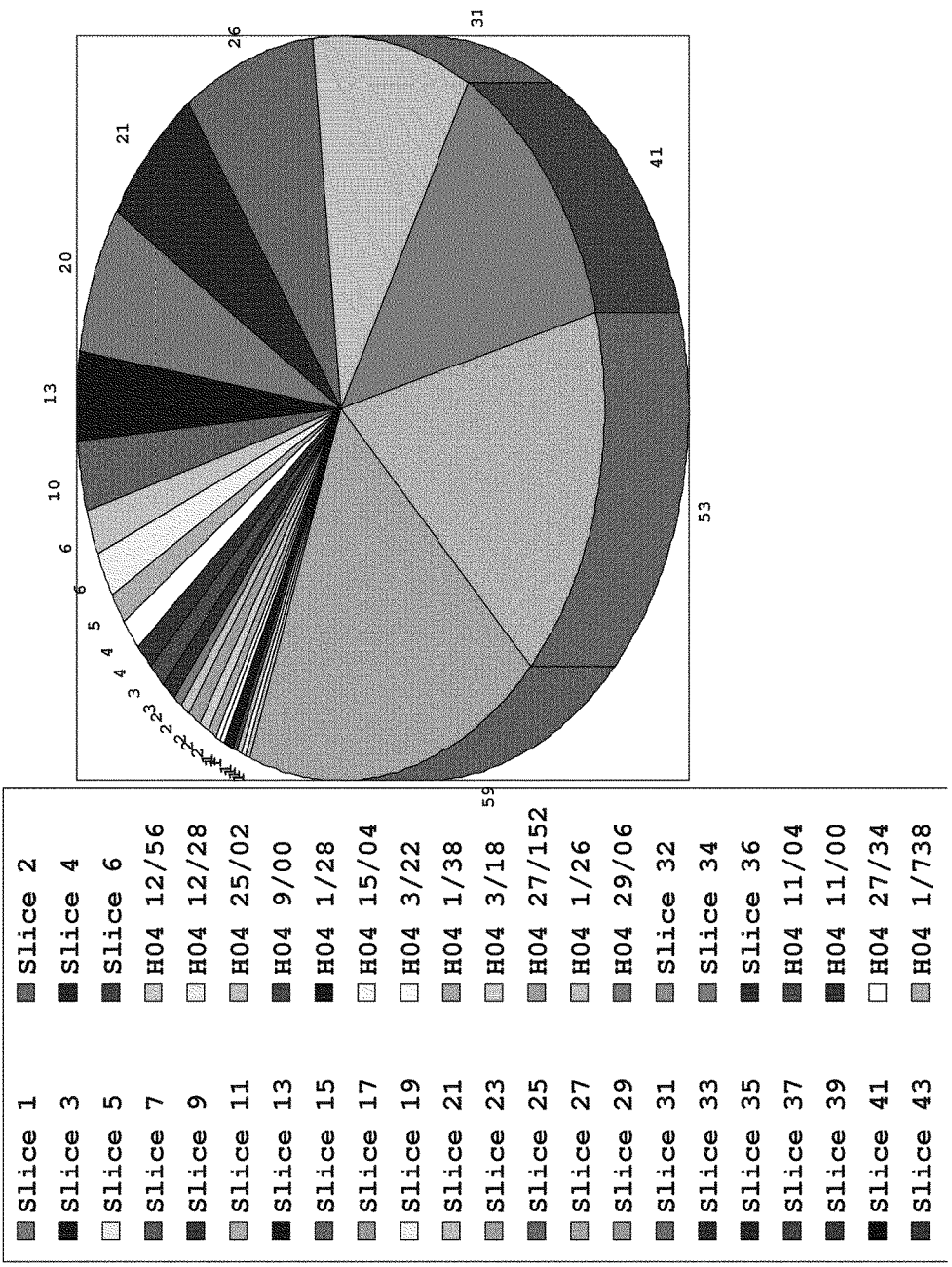
FIG. 6a is a schematic pie chart with breakdown of top 3 digit IPC code by full digit IPC code—H04 for a specific search query.
Figure 6B:
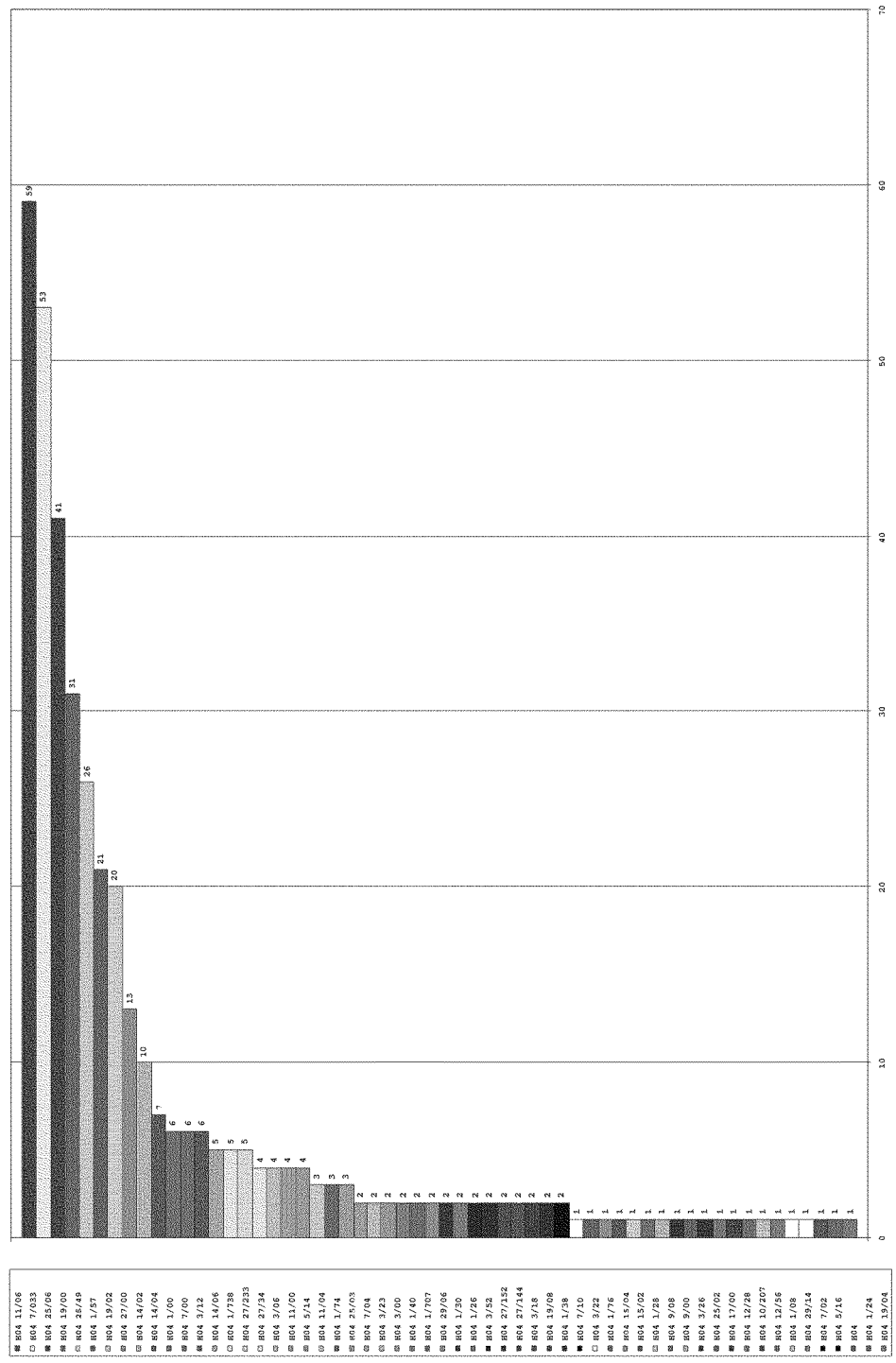
FIG. 6b is a schematic histogram plot with breakdown of top 3 digit IPC code by full digit IPC code—H04 for a specific search query.

In FIG. 6a and FIG. 6b, schematic pie chart and histogram plot with breakdown of top 3 digits IPC code by full digit IPC code—H04 for a specific search query are shown respectively. When using patent information in this way, it is always important to put it in the context of other business information about the organization. In many cases, for small business, the inventors are, in fact, one of the original founders of the company. Further visualization analysis could serve as tools that can be used to carry out further analysis of the inventions associated with key individuals, and so reveal their particular areas of expertise. The 3 digit IPC code in general gives information about the area (say medical, engineering, construction etc) in which the patents were field.

Figure 7A:
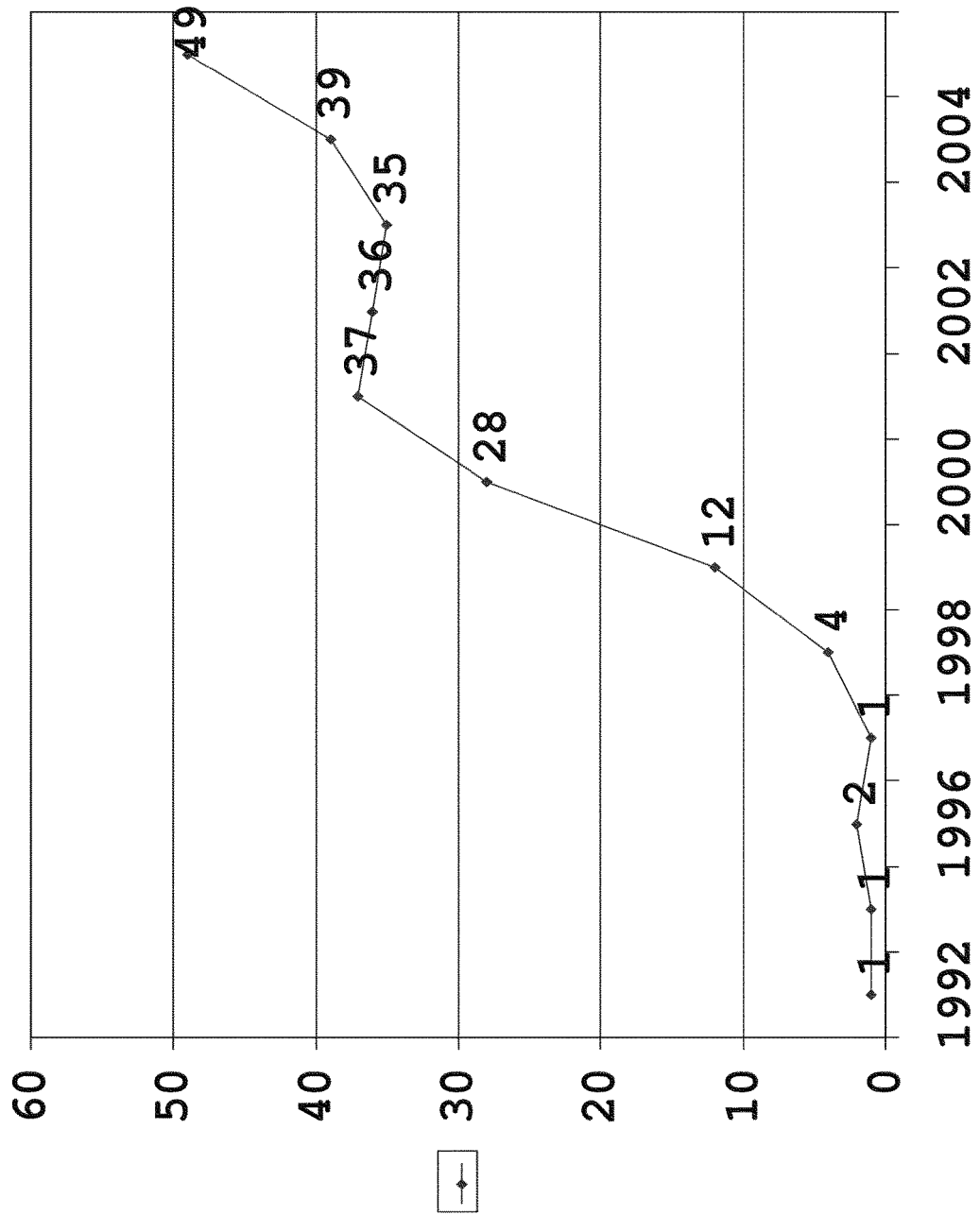
FIG. 7a is a schematic 2D graph of the patents issued per year for a specific search query.
Figure 7B:
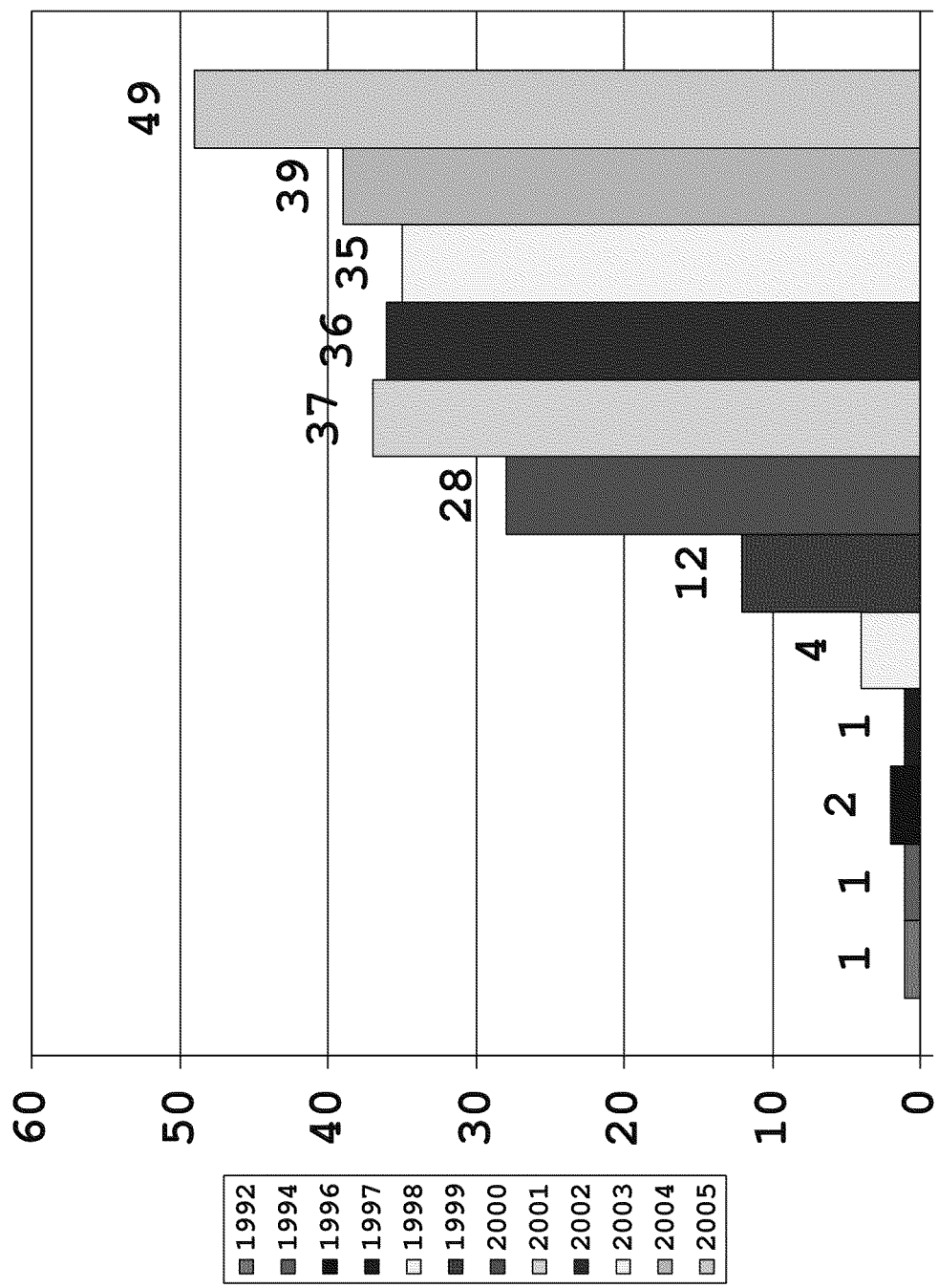
FIG. 7b is a schematic histogram plot of the patents issued per year for a specific search query.

In FIG. 7a and FIG. 7b, schematic 2D graph and histogram plot of the patents issued per year for a specific search queries are shown respectively. When presented in a visual graph, the patent filing dates by year that shows the patent activity over time. A peak in a particular period would indicate major activity in this time frame. It also helps the user to know that if the patent being filed is gaining interest in the market or not.

Figure 8A:
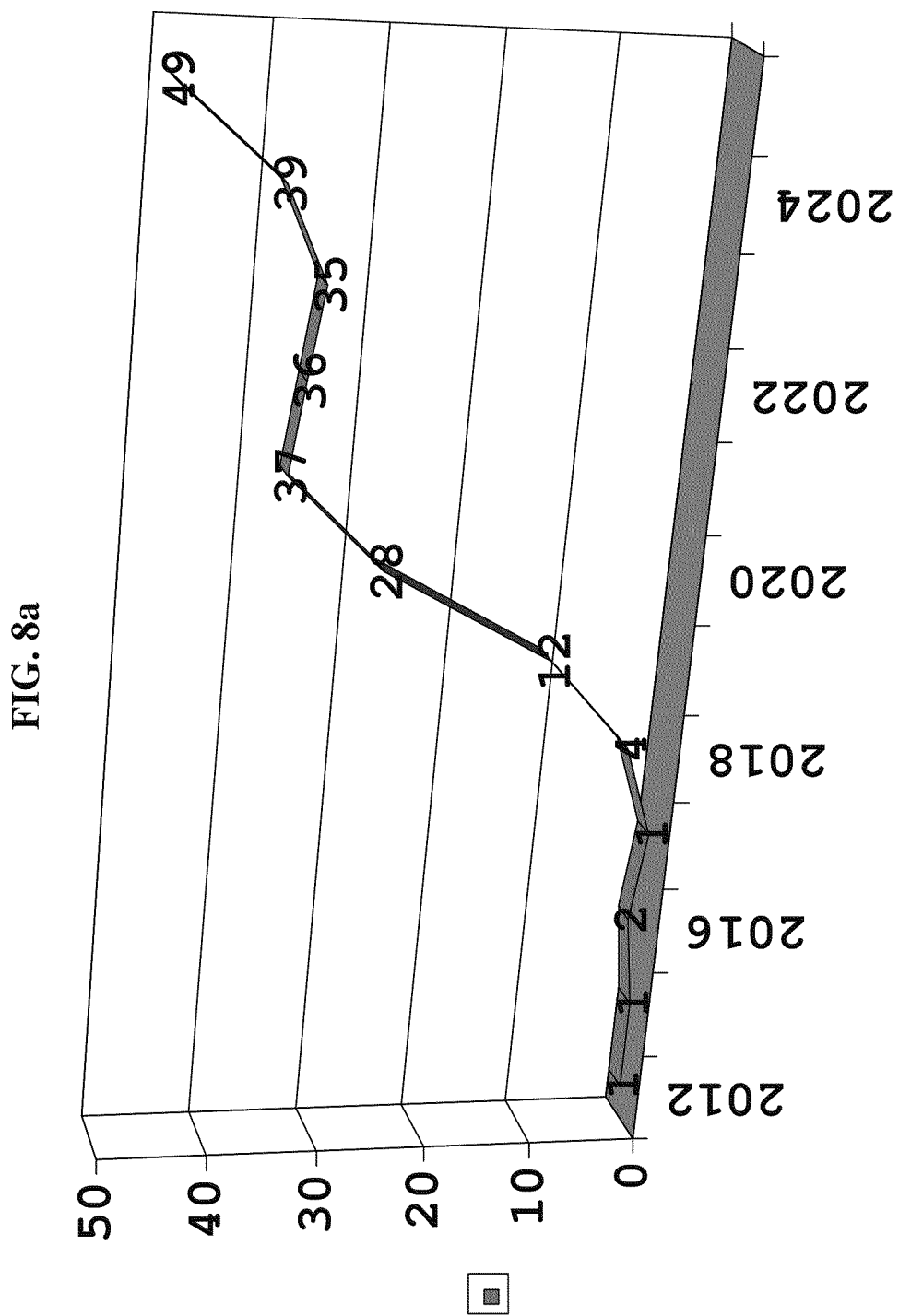
FIG. 8a is a schematic 2D graph of the patents expired per year for a specific search query.

In FIG. 8a and FIG. 8b, schematic 2D graph and histogram plot of the patents expired per year for specific search queries are shown. Patents filed after 1995 expire 20 years from the date of filing. When presented in a visual graph, the patent expiration date grouped by the year is an excellent indication to the timeframe it becomes a common knowledge in the public domain.

Figure 9A:
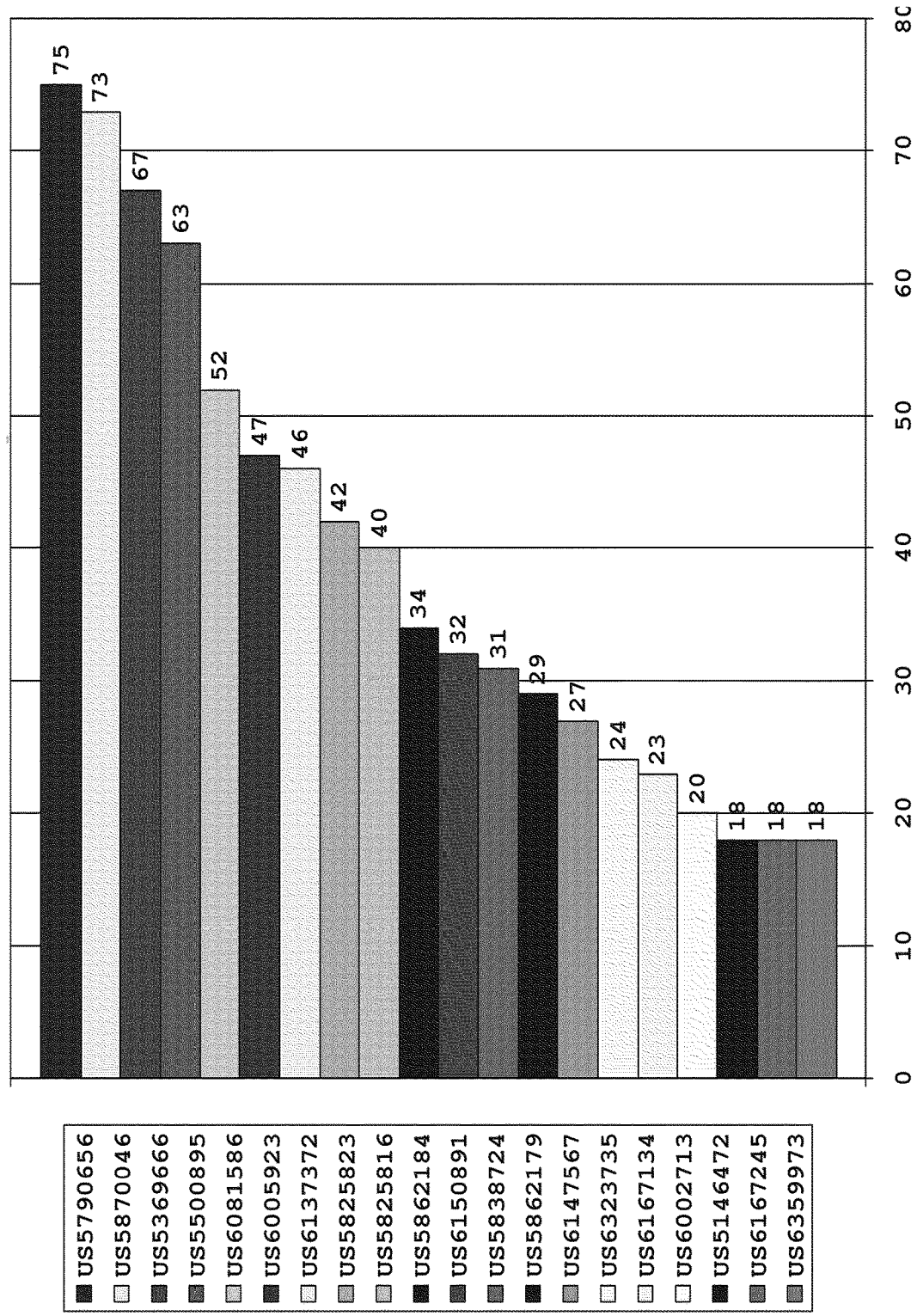
FIG. 9a is a schematic histogram plot of the 20 most cited US patents by publication number.

In FIG. 9a and FIG. 9b, a schematic histogram plot of the 20 most and 10 most cited US patents by publication number are shown respectively. This illustrates the US patent citation relationships for each one of the patents from the portfolio. The patent of interest—top cited—is in the head of the citation analysis. Such a citation analysis has a number of applications in addition to the identification of organizations that may represent potential licensees for a technology, such as the identification of non-obvious competitors and potential infringement issues.

Figure 10:
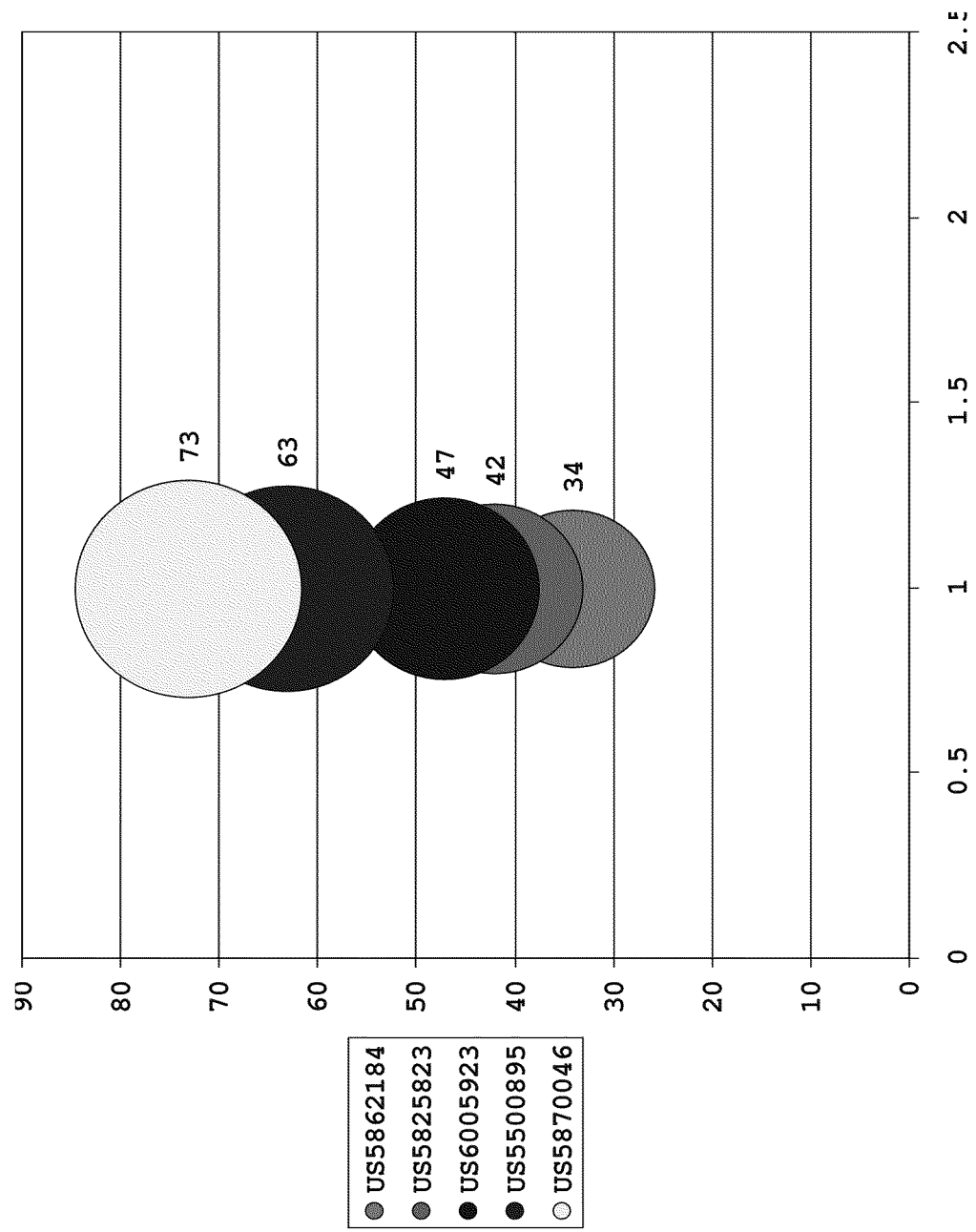
FIG. 10 is a schematic diagram of 10 most important patents.
Figure 11A:
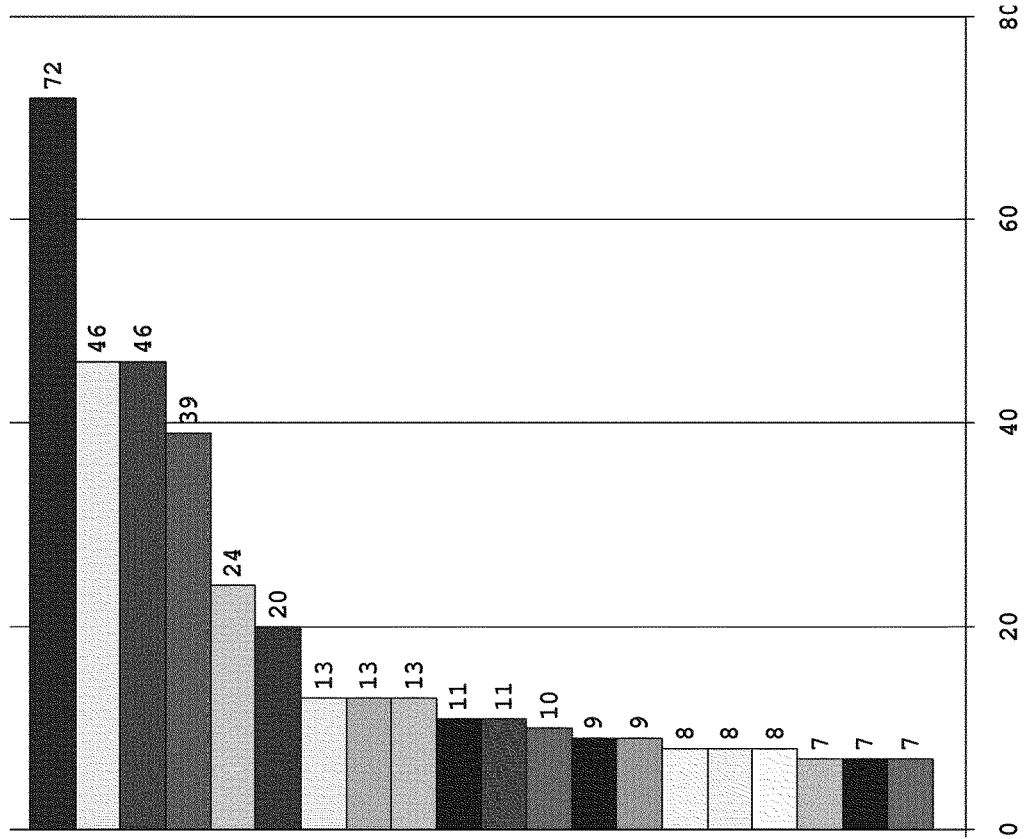
FIG. 11a is a schematic histogram plot of the top 20 inventors.

In FIG. 10, a schematic diagram of 10 most important patents is shown. In FIG. 11a, FIG. 11b, schematic histogram plot and pie chart of the top 20 inventors are shown. By recognizing the most cited patents and then identifying the inventor information can be of particular relevance in the case of merger and acquisition activity. For example, in a takeover scenario, patent analysis can be used to identify those individuals who are the key to the future product development pipeline of an organization in the post-acquisition phase.

An important piece of information that patent data analysis can provide is the identity of key individuals involved in developing a technology. This can be invaluable to an organization seeking to enhance its inventive capacity by recruiting key staff. This analysis is based on data from the portfolio identified in the Patents database. The individual inventor names are mapped against the number of patent families where those names appear. Information about the individuals associated with new inventions of this type could be of particular value to a company searching for expertise in the field of the discussed technology.

When presented in a visual graph the key inventors or patentees. The resulting illustration shows the top patent assignees in the discussed technology, portfolio or key word search. These include many familiar names from the discussed industry. This approach is innovative unique analysis method that can be used to identify competitors, possible business partners, and or possible infringers in the field. This can be of particular importance for small business entities individuals which may have new technology but not the resources to bring this to a large customer base.

Figure 12:
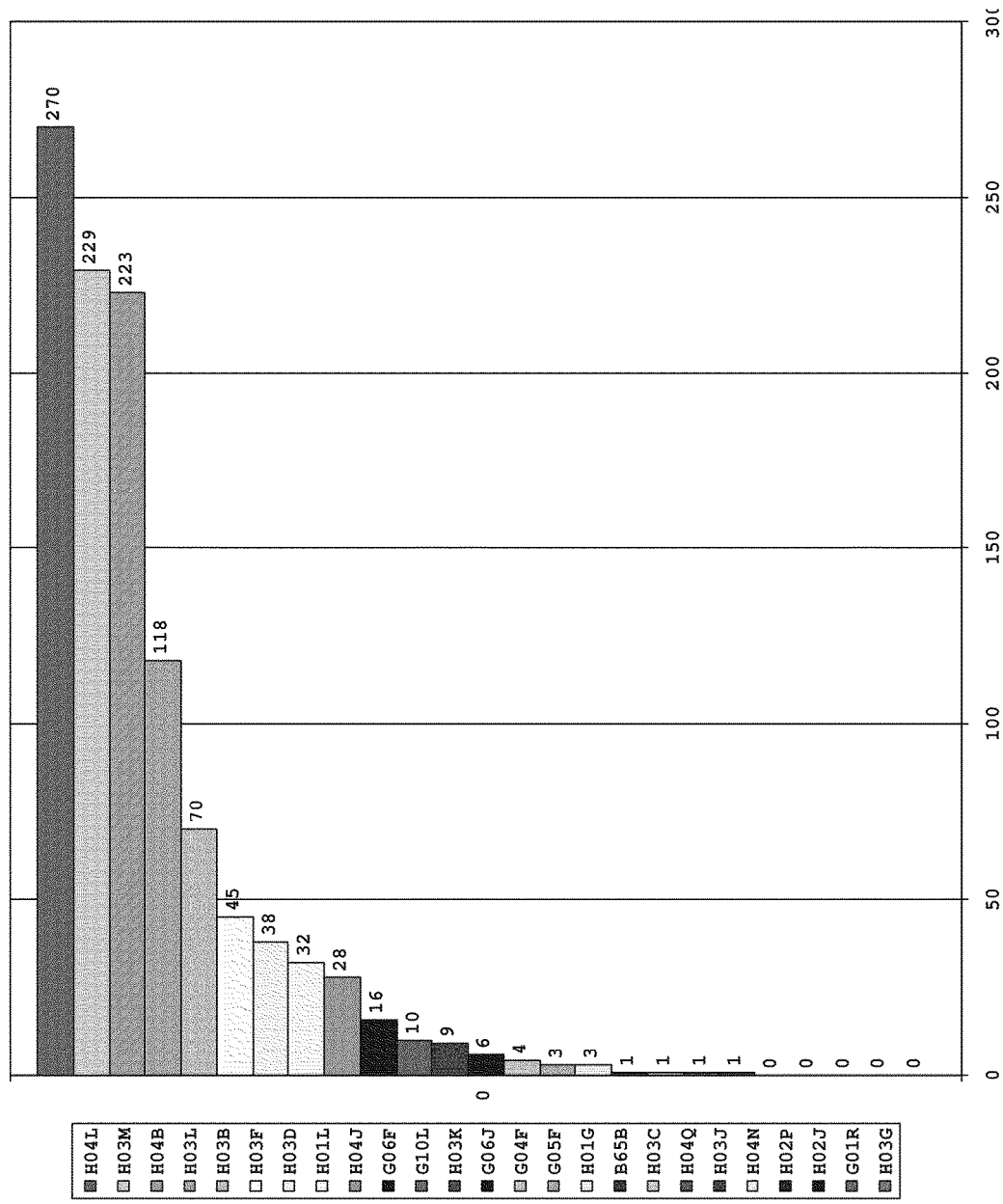
FIG. 12 is a schematic histogram plot of the most cited US patents by IPC code.

In FIG. 12, a schematic histogram plot of the most cited US patents by IPC code. The specific focus of the inventions associated with each individual inventor can be analyzed in more detail using the International Patent Classifications (IPCs) assigned to each patent publication.

Figure 13A:
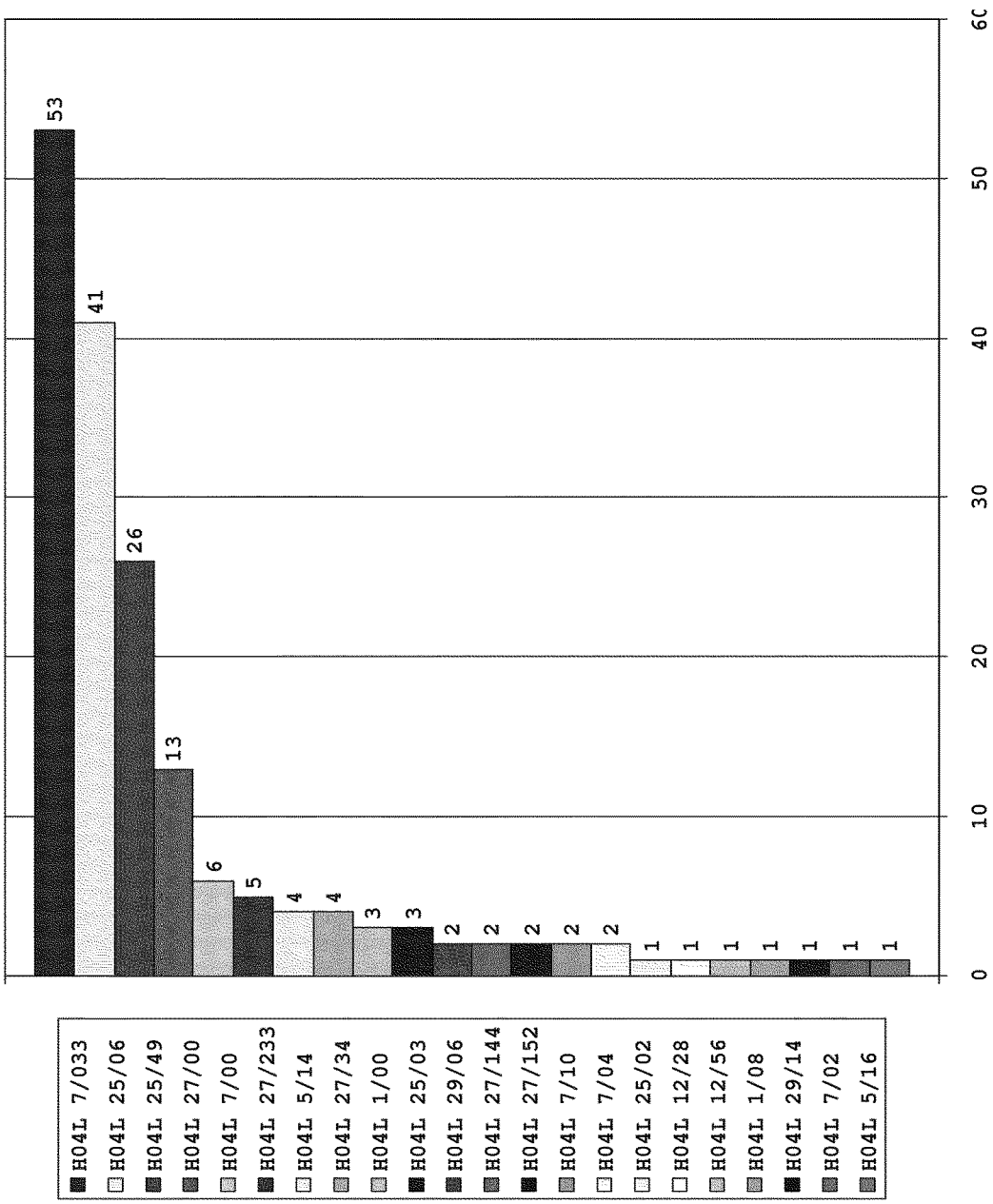
FIG. 13a is schematic histogram of the breakdown of top 4 digit IPC code by full digit IPC code—H04L.
Figure 13B:
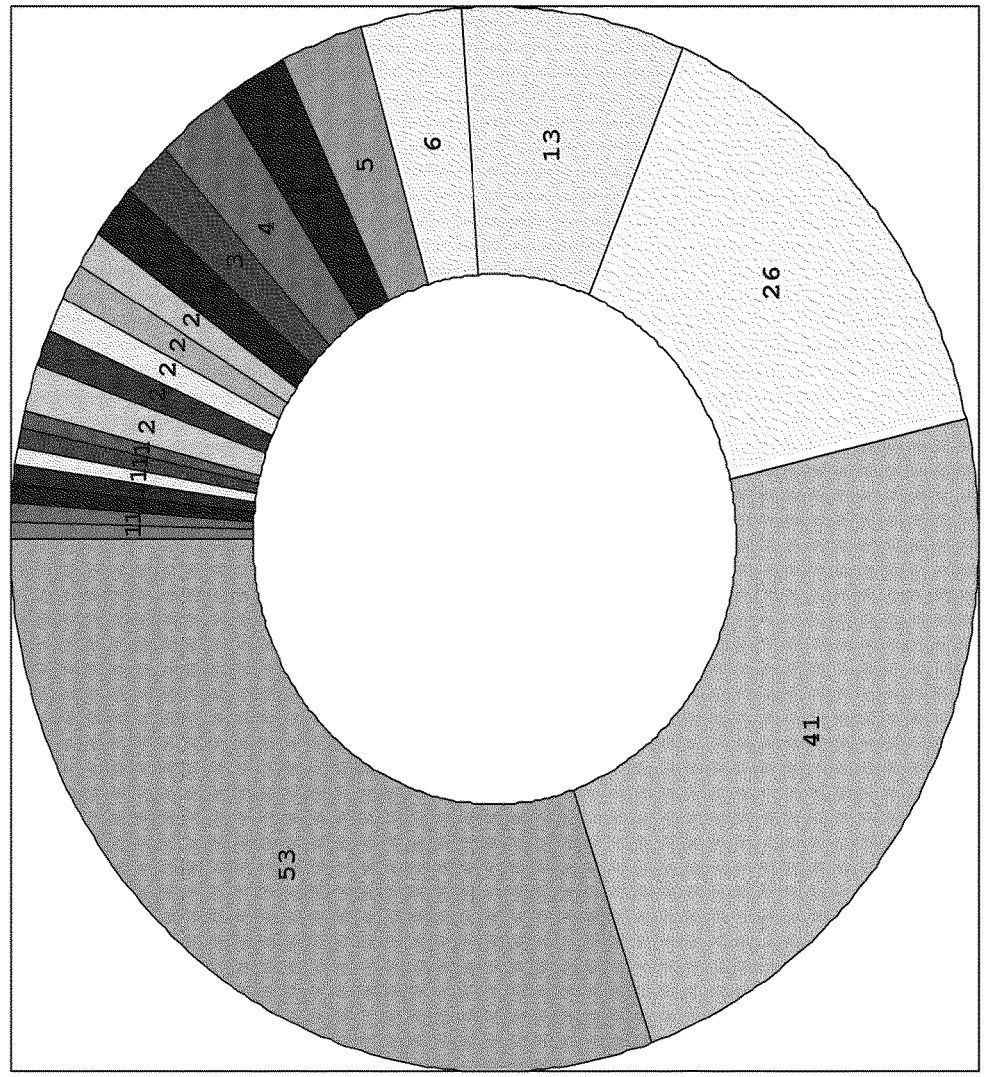
FIG. 13b is schematic pie chart of the breakdown of top 4 digit IPC code by full digit IPC code—H04L.

In FIG. 13a and FIG. 13b, schematic histogram plot and pie chart of the breakdown of top 4 digit IPC code by full digit IPC code—H04L are shown. It is also an innovative and useful method to search further and analyze the rankings of organizations patenting in a particular classification (technology sector), in order to identify the inventors or small business players who may be suitable sources of licensing the technology to, potential business combinations, or acquisition candidates.

Figure 14:
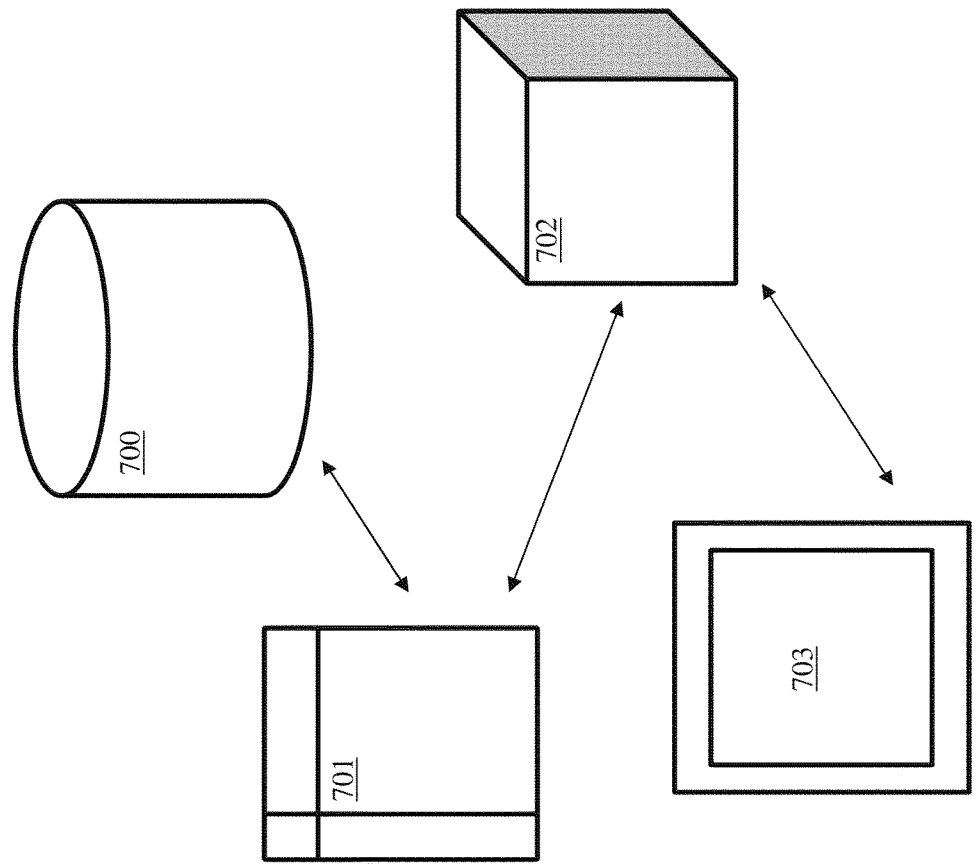
FIG. 14 is a schematic diagram featuring one embodiment of the invention featuring a specialized processor and other machinery.

In FIG. 14 a database of patents 700 is in communication with a server 701 which is in communication with a specialized processor 702 which is in communication with a consumer screen 703 or consumer computer system. In one embodiment, a consumer uses their consumer computer system 703 to input a string of search words or search characters. The search string is sent to a specialized processor 702 for translation into machine code and transmits its output to a specialized server 701 which in turn retrieves the desired patent documents from a patent database 700.

After the desired patent documents enter the specialized server 701 the documents are sent to the specialized processor to be parsed and sorted by user defined criteria. Such user defined criteria may be entered by a consumer using a consumer computer system 703. The specialized processor 702 may generate a textual and/or graphical output by manipulation of the documents and information received from the specialized server 701.

Figure 15:
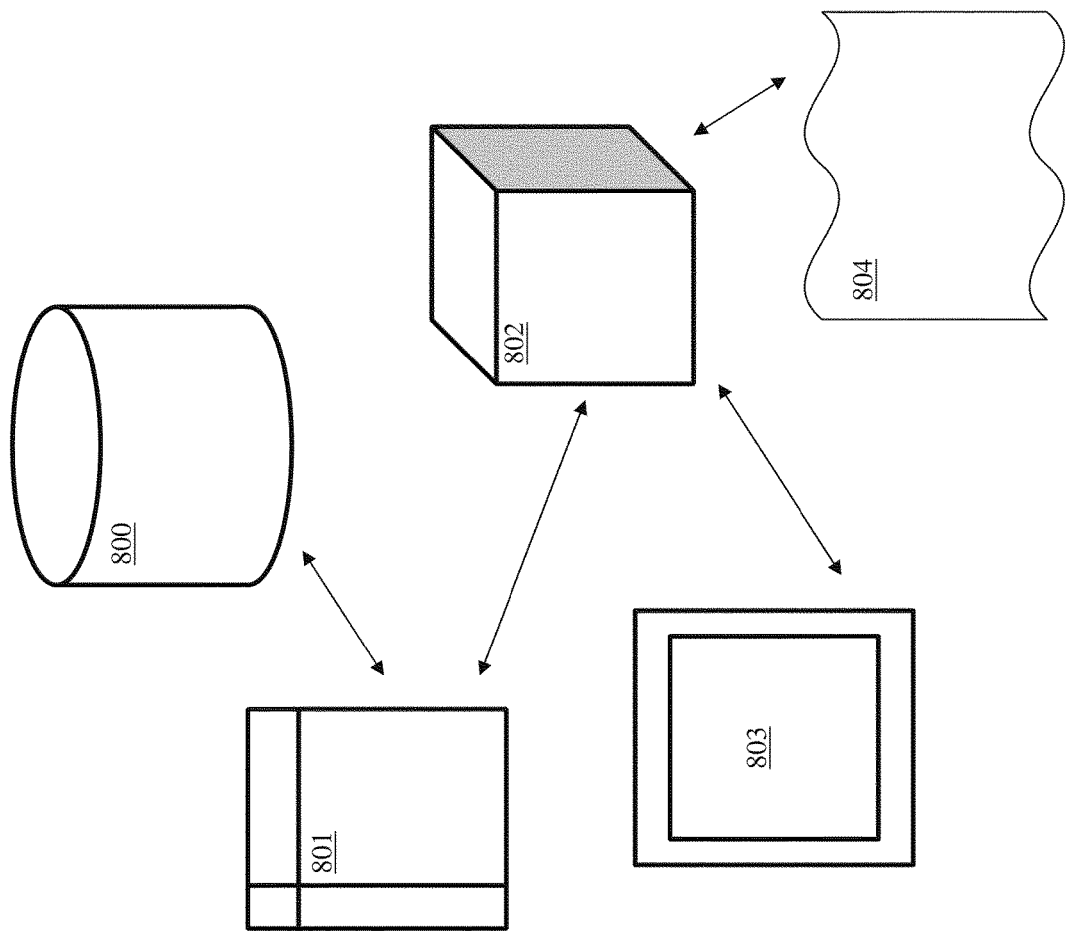
FIG. 15 is a schematic diagram displaying one embodiment of the invention.

In FIG. 15 a database of patents 800 is in communication with a specialized server 801 which is in communication with a specialized processor 802. The specialized processor is in communication with a specialized computer readable medium 804. The computer readable medium 804 may store user defined search criteria and user requested formats of textual and/or graphical search results. In one embodiment, the specialized processor 802 communicates with the specialized computer readable medium 804 to retrieve user defined search display demands. The specialized processor 802 may then produce graphical and/or textual displays, such as the ones shown in FIG. 1, 2 or 3, and transmits such generated displays to a consumer screen 803 or consumer computer system.

In yet another contemplated embodiment, a specialized computer readable medium 804, is used by a specialized processor 802 to update past searches with new patent documents added to the patent database 800. Thus, past search strings and user preferences may be stored within the specialized computer readable medium 804 and then periodically referenced by the specialized processor 802 which in turn may communicate with the specialized server 801 to search a patent database 800. Over time, the patent database 800 may be updated with new patent documents.

In this invention, we have looked at some of the patent data analysis techniques that can answer key questions involved in developing an effective patent portfolio management strategy. The returns that can be realized by streamlining areas of competence, as well as directly through licensing revenues, are substantial, and increasingly contribute a significant proportion of the earnings of technology-based businesses. The patent data analysis techniques described here, used wisely and in conjunction with the effective management of a patent portfolio, can help organizations extract pure gold from the nuggets of technology covered by the patents they own.

While the invention has been described with reference to a detailed example of the preferred embodiment thereof, it is understood that variations and modifications thereof may be made without departing from the true spirit and scope of the invention. Therefore, it should be understood that the true spirit and scope of the invention are not limited by the above embodiment, but defined by the appended claims and equivalents thereof.

Various embodiments of this disclosure are further described by the Items listed below, but this disclosure is not limited by the Items or Claims herein. Definitions of terms describe within the Items herein may be used to help define terms within the Claims, but do not limit the Claims or terms used within the Claims.

Items

Item 1. A specialized computer system, FIG. 14, including at least one specialized processor 702, 802, the system comprising:
 a) a specialized processor 802, the specialized processor receiving search strings and user preferences dictating the display of search results;
 b) a specialized computer readable medium 804, with the computer readable medium in communication with the specialized processor 802 and the computer readable medium storing search strings and user preferences dictating the display of search results;
 c) a specialized server 801 in communication with the specialized processor 802 and in communication with a patent database 800, wherein the specialized server searches for patent documents within the patent database 800 and wherein the specialized server 801 retrieves patent documents and sends patent documents to the specialized processor;
 d) upon receipt of patent documents the specialized processor 802 creates search result documents in conformance with the user preferences stored within the specialized computer readable medium 804; and
 e) the search result documents are then transmitted to a consumer screen 803.

Item 2. The system of item 1 wherein the specialized processor repeats past patent document searches based upon criteria stored within the specialized computer readable medium 804 and then produces updated search result documents to a consumer screen.

Item 3. The system of item 1 wherein search result documents FIG. 1, FIG. 2 and FIG. 3 include a display in a text format FIG. 1 312 and a statistical display of search results 313.

Item 4. The system of item 1 wherein search result documents comprise a pie chart FIG. 6*a* comprising patent classification codes of retrieved patent documents.

Item 5. The system of item 1 wherein search result documents comprise a chart FIG. 7*a* displaying the year of patent issuance as compared to the number of retrieved patents.

Item 6. The system of item 1 wherein search result documents comprise a bar chart FIG. 6*b* comprising patent classification codes and the numbers of patents retrieved from the patent database.

Item 7. The system of item 1 wherein search result documents comprise search results displayed upon the same view as statistical displays, FIG. 1.

Item. 8 The system of item 1 wherein search result documents comprise financial analysis providing estimates of the financial value of patents owned by an entity.

Item 9. The system of item 8 wherein search result documents comprise statistical analysis of patents owned by a selected entity.

Item 10. A specialized computer implemented method of obtaining, retrieving, analyzing and displaying search results, the method comprising:

a) a user entering a string of search criteria and user preferences dictating the display of search results;
b) the user entered search string and display preferences entering a specialized processor and being stored within a specialized computer readable medium;
c) the specialized processor transmitting the user entered search string to a server;
d) the server searching a database for documents corresponding to the entered search string;
e) the server obtaining documents corresponding to the entered search string and sending such documents to the specialized processor;
f) the specialized processor assembling search result documents in a textual and graphical format that is transmitted to the user.

Item 11. The method of item 10 further comprising the specialized processor generating financial data mapping to patents owned by a selected entity.

Item 12. The method of item 11 further comprising a user entering onto the specialized computer readable medium financial attributes mapped to patent attributes.

Item 13. A computer implemented method of obtaining statistical snap shots of patent document data, the method comprising:
a) a user entering a search string and display preferences to a specialized computer system;
b) a specialized computer system retrieving requested information data only, without retrieving entire patent documents;
c) the specialized computer system generating user statistical data in response to the entered search string.

Item 14. The method of item 13 wherein the specialized computer system generates financial data pertaining to a selected patent owning entity and wherein the financial data is based upon patent attributes owned by the selected patent owning entity.

Item 15. A specialized computer system, FIG. 14, including at least one specialized processor, and delivering search result documents based upon any category selected by a user, the system comprising:
a) a specialized processor 802, the specialized processor receiving search strings and user preferences dictating the display of search results, wherein the search results comprise cross references and triangulations pertaining to user selected search criteria, with user selected search criteria selected from the group comprising financial data based upon an entity's portfolio of intellectual property, patent documents cross referenced to an entity, and any other user selected category of user selected criteria;
b) a specialized computer readable medium 804, with the computer readable medium in communication with the specialized processor 802 and the computer readable medium storing search strings and user preferences dictating the display of search results;
c) a specialized server 801 in communication with the specialized processor 802 and in communication with a patent database 800, wherein the specialized server searches for patent documents within the patent database 800 and wherein the specialized server 801 retrieves patent documents and sends patent documents to the specialized processor;
d) upon receipt of patent documents the specialized processor 802 creates search result documents in conformance with the user preferences stored within the specialized computer readable medium.

Item 16. The specialized computer system of item 15, wherein the specialized processor 802 uses monetary values mapped to patent attributes to generate a monetary estimate of a patent portfolio owned by an entity.

Item 17. The specialized computer system of item 16, wherein the specialized processor 802 performs a statistical analysis of patent documents owned by a selected patent owning entity.

What is claimed is:

1. A specialized computer system, the system comprising:
a) a specialized computer processor the specialized computer processor receiving search strings and user preferences dictating a display of search results, wherein the user preferences comprise specific instructions corresponding to at least one of font size, text color, and background of output information;
b) a specialized non-transitory computer readable medium in communication with the specialized computer processor and the specialized non-transitory computer readable medium storing the search strings and the user preferences;
c) a specialized server in communication with the specialized computer processor and in communication with a patent database, wherein the specialized server searches for patent documents within the patent database and wherein the specialized server retrieves patent documents and sends patent documents to the specialized computer processor, and wherein each patent document discloses a technology;
d) upon receipt of patent documents the specialized computer processor creates search result documents and analyzes the search result documents to:
 identify identities of key individuals involved in developing the technology disclosed;
 perform at least one of:
  sorting the search result documents based on user defined criteria; and
  ranking of the search result documents based on the disclosed technology,
the search result documents comprising cross reference and triangulation information pertaining to the search criteria, a textual description of each of the search result documents, the identities of the identified key individuals, and a statistical representation of one or more of the search result documents in a single view, in conformance with the user preferences stored within the specialized non-transitory computer readable medium, wherein the search result documents comprise a user selected search criteria selected from a group comprising financial data based upon an entity's portfolio of intellectual property, search result documents cross referenced to the entity, and user selected category of user selected criteria; and
e) the search result documents are then transmitted to a consumer screen.

2. The system of claim 1 wherein the specialized computer processor is configured to repeat past patent document searches based upon criteria stored within the specialized non-transitory computer readable medium and then transmit updated search result documents to the consumer screen.

3. The system of claim 1 wherein at least one of search result documents comprise a pie chart, the pie chart comprising patent classification codes of retrieved patent documents.

4. The system of claim 1 wherein at least one of the search result documents comprise a chart displaying a year of patent issuance as compared to the number of retrieved patent documents.

5. The system of claim 1 wherein at least one of the search result documents comprise a bar chart comprising one or more patent classification codes and numbers of the retrieved patent documents.

6. The system of claim 1 wherein at least one of the search result documents comprises a financial analysis providing estimates of a financial value of one or more patents owned by an entity.

7. The system of claim 6 wherein the financial analysis comprises statistical analysis of one or more patents owned by an entity.

8. A specialized computer implemented method of obtaining, retrieving, analyzing and displaying search results, the method comprising:
   a) receiving, at a specialized computer processor, a search criteria and the display preference from a user, wherein the display preferences comprises specific instructions corresponding to at least one of font size, text color, and background of output information;
   b) storing the search criteria and the display preference at a specialized non-transitory computer readable medium;
   c) transmitting the search criteria to a server;
   d) the server providing one or more documents from a database to the specialized computer processor based on the search criteria; and
   e) the specialized computer processor generating search result documents and analyzing the search result documents to
      identify identities of key individuals involved in developing technology disclosed in the search result documents;
      perform at least one of:
         sorting the search result documents based on user defined criteria; and
         ranking of the search result documents based on the disclosed technology,
      the search result documents comprising cross reference and triangulation information pertaining to the search criteria, a textual description of each of the search result documents, the identities of the identified key individuals, and a statistical representation of one or more of the search result documents in a single view based on the display preference, wherein the search result documents comprise a user selected search criteria selected from a group comprising financial data based upon an entity's portfolio of intellectual property, search result documents cross referenced to the entity, and user selected category of user selected criteria.

9. The method of claim 8 further comprising generating financial data for one or more patents owned by an entity.

10. A computer implemented method of obtaining one or more statistical snapshots of patent document data, the method comprising:
   a) a user entering a search string and display preference to a specialized computer system, wherein the user preferences comprise specific instructions corresponding to at least one of font size, text color, and background of output information;
   b) the specialized computer system retrieving the patent document data based on the search string; and
   c) the specialized computer system generating statistical data based on the patent document data;
   d) the specialized computer system generating search result documents and analyzing the search result documents to:
      identify identities of key individuals involved in developing technology disclosed in the search result documents;
      perform at least one of:
         sorting the search result documents based on user defined criteria; and
         ranking of the search result documents based on the disclosed technology,
      the search result documents comprising cross reference and triangulation information pertaining to the search criteria, a textual description of each of the search result documents, the identities of the identified key individuals, and a statistical representation of one or more of the search result documents in a single view based on the display preference,
      wherein the search result documents comprise a user selected search criteria selected from a group comprising financial data based upon an entity's portfolio of intellectual property, search result documents cross referenced to the entity, and user selected category of user selected criteria.

11. The method of claim 10 wherein the statistical data comprises financial data related to one or more patents owned by an entity.

12. A specialized computer system, for delivering search results based upon any category selected by a user, the system comprising:
   a) a specialized computer processor, the specialized computer processor configured to receive a search criteria and a user preference dictating a display of search results, wherein the user preference comprises specific instructions corresponding to at least one of font size, text color, and background of output information, further wherein the search results comprise cross references and triangulations pertaining to the search criteria, further wherein the search criteria is selected from a group consisting of financial data associated with an entity's portfolio of intellectual property and patent documents cross referenced to the entity;
   b) a specialized non-transitory computer readable medium in communication with the specialized computer processor configured to store the search criteria and the user preference;
   c) a specialized server in communication with the specialized processor and in communication with a patent database, the specialized server configured to search for the patent documents within the patent database retrieve the patent documents, and send the patent documents to the specialized computer processor; and
   d) upon receipt of patent documents, the specialized processor creates the search results and analyzes the search result documents to:
      identify identities of key individuals involved in developing technology disclosed in the search result documents;
      perform at least one of:
         sorting the search result documents based on user defined criteria; and
         ranking of the search result documents based on the disclosed technology,
      the search results comprising a textual description of each of the search results, the identities of the identified key individuals, and a statistical representation of one or more of the search results in a single view in conformance with the user preference, wherein the search result documents comprise a display of an estimated financial value of one or more patent owning entities, and wherein the financial value is estimated, and wherein the estimated financial value is generated based on mapping of one or more financial attributes to one or more patent attributes.

13. The specialized computer system of claim 12, wherein the specialized processor performs a statistical analysis of patent documents owned by a selected patent owning entity.

* * * * *